(12) United States Patent
Yoshida et al.

(10) Patent No.: US 9,025,187 B2
(45) Date of Patent: May 5, 2015

(54) PRINTING SYSTEM INCLUDING AN IMAGE FORMING APPARATUS AND A MANAGEMENT SERVER THAT MANAGES A PRINT ALLOWANCE OF A USER, AND PRINTING METHOD PERFORMED BY THE PRINTING SYSTEM

(71) Applicant: KYOCERA Document Solutions Inc., Osaka (JP)

(72) Inventors: Daisuke Yoshida, Osaka (JP); Keisaku Matsumae, Osaka (JP); Ryusuke Nakatani, Osaka (JP)

(73) Assignee: KYOCERA Document Solutions Inc. (JP)

( * ) Notice: Subject to any disclaimer, the term of this patent is extended or adjusted under 35 U.S.C. 154(b) by 20 days.

(21) Appl. No.: 13/952,547

(22) Filed: Jul. 26, 2013

(65) Prior Publication Data
US 2014/0029042 A1 Jan. 30, 2014

(30) Foreign Application Priority Data
Jul. 30, 2012 (JP) ................................ 2012-167933

(51) Int. Cl.
*G06F 3/12* (2006.01)
*H04N 1/00* (2006.01)
*H04N 1/44* (2006.01)

(52) U.S. Cl.
CPC ......... *H04N 1/00068* (2013.01); *H04N 1/4413* (2013.01); *H04N 1/00644* (2013.01); *H04N 1/00344* (2013.01); *H04N 1/00832* (2013.01); *H04N 1/4426* (2013.01); *H04N 1/4433* (2013.01); *H04N 2201/0039* (2013.01); *H04N 2201/0094* (2013.01)

(58) Field of Classification Search
USPC .................................................. 358/1.1–1.16
See application file for complete search history.

(56) References Cited

U.S. PATENT DOCUMENTS
2013/0308147 A1* 11/2013 Wu et al. ...................... 358/1.13

FOREIGN PATENT DOCUMENTS
JP  2008-140067      6/2008
JP   2008140067 A    6/2008

OTHER PUBLICATIONS

Extended European Search Report and Opinion for App. No. EP 13178490.2, mailed Jul. 23, 2014, 9 pages.

* cited by examiner

*Primary Examiner* — Benny Q Tieu
*Assistant Examiner* — Michael Y Tzeng
(74) *Attorney, Agent, or Firm* — McDonnell Boehnen Hulbert & Berghoff LLP

(57) ABSTRACT

A printing system includes a management server and an image forming apparatus connected to each other via a network. The management server executes an authentication of a logged-in user of the image forming apparatus, manages a remaining quota and a temporary allowance, reserves the temporary allowance of the logged-in user, and provides a notification to the image forming apparatus of the reserved temporary allowance. The image forming apparatus provides a notification to the management server of a requested sheet count, executes printing within a range of the temporary allowance notified of by the management server, and provides a notification to the management server of a printed sheet count.

16 Claims, 13 Drawing Sheets

24e TEMPORARY ALLOWANCE INFORMATION

| USER ID | TEMPORARY ALLOWANCE |
|---|---|
| USER001 | 0 |
| USER002 | 0 |
| USER003 | 60 |
| . . . | . . . |

FIG. 5

PRINTING SYSTEM INCLUDING AN IMAGE FORMING APPARATUS AND A MANAGEMENT SERVER THAT MANAGES A PRINT ALLOWANCE OF A USER, AND PRINTING METHOD PERFORMED BY THE PRINTING SYSTEM

INCORPORATION BY REFERENCE

This application is based upon, and claims the benefit of priority from, corresponding Japanese Patent Application No. 2012-167933, filed in the Japan Patent Office on Jul. 30, 2012, the entire contents of which are incorporated herein by reference.

FIELD

Unless otherwise indicated herein, the description in this background section is not prior art to the claims in this application and is not admitted to be prior art by inclusion in this section. The present disclosure relates to a printing system including an image forming apparatus and a management server that manages a print allowance of a user, and to a printing method performed by the printing system.

BACKGROUND

A typical printing system includes an image forming apparatus and a management server that manages a remaining quota representing a remaining number of print sheets allocated to a group to which a user belongs. In the typical printing system, the management server determines a temporary allowance, which represents a number of sheets for which the user is temporarily allowed to perform printing, out of the remaining quota of the group to which the user who has logged in to the image forming apparatus belongs. The image forming apparatus executes the printing when the temporary allowance exists.

In the typical printing system, when the image forming apparatus executes printing a number of sheets exceeding the temporary allowance, the image forming apparatus requests the management server to add another temporary allowance.

The image forming apparatus requests the management server to add another temporary allowance after starting the printing, and hence there is a problem in that the printing is finished against the user's will when the added temporary allowance is insufficient because, for example, the remaining quota of the group to which the user who has logged in to the image forming apparatus belongs is small.

SUMMARY

The present disclosure relates to a printing system including an image forming apparatus and a management server that manages a print allowance of a user, which prevents printing from being only partially finished against the user's will, and a printing method performed by the printing system.

A printing system according to an embodiment of the present disclosure includes a management server and an image forming apparatus that are both connected to a network. The management server includes an authentication execution unit, a sheet count management unit, and a temporary allowance notification unit. The authentication execution unit is configured to authenticate a logged-in user of the image forming apparatus. The sheet count management unit is configured to i) manage a remaining quota that represents a remaining number of print sheets allocated to a group to which the logged-in user belongs and a temporary allowance that represents a number of print sheets temporarily allowed for every user that belongs to the group, and ii) reserve the temporary allowance of the logged-in user. The temporary allowance notification unit is configured to provide a notification including the temporary allowance to the image forming apparatus. The image forming apparatus includes a requested sheet count notification unit, a printing execution unit, and a printed sheet count notification unit. The requested sheet count notification unit is configured to provide a notification including the requested sheet count to the management server. The requested sheet count represents a sheet count based on an instruction for printing, and is a number of print sheets for which permission is requested from the management server. The printing execution unit is configured to print within a range of the temporary allowance notified of by the management server. The printed sheet count notification unit is configured to provide a notification including the printed sheet count to the management server, where the printed sheet count represents a number of sheets for which the printing has been executed by the printing execution unit.

A printing method according to an embodiment of the present disclosure is performed by a printing system including a management server and an image forming apparatus that are both connected via a network. The printing method includes the management server executing an authentication of a logged-in user of the image forming apparatus. The management server manages a remaining quota that represents a remaining number of print sheets allocated to a group to which the user belongs and a temporary allowance that represents a number of print sheets temporarily allowed for every user that belongs to the group. The management server reserves the temporary allowance of a logged-in user and provides a notification to the image forming apparatus of the reserved temporary allowance. The image forming apparatus provides a notification to the management server of a requested sheet count that represents a sheet count based on an instruction for printing, and is a number of print sheets for which permission is requested from the management server. The image forming apparatus executes printing within a range of the temporary allowance notified of by the management server, and provides a notification to the management server of a printed sheet count that represents a number of sheets for which the printing has been executed.

BRIEF DESCRIPTION OF THE FIGURES

In the accompanying drawings:

FIG. 5 is a tabular diagram illustrating an example of temporary allowance information used in the management server;

DETAILED DESCRIPTION

First Embodiment

Figure 1:
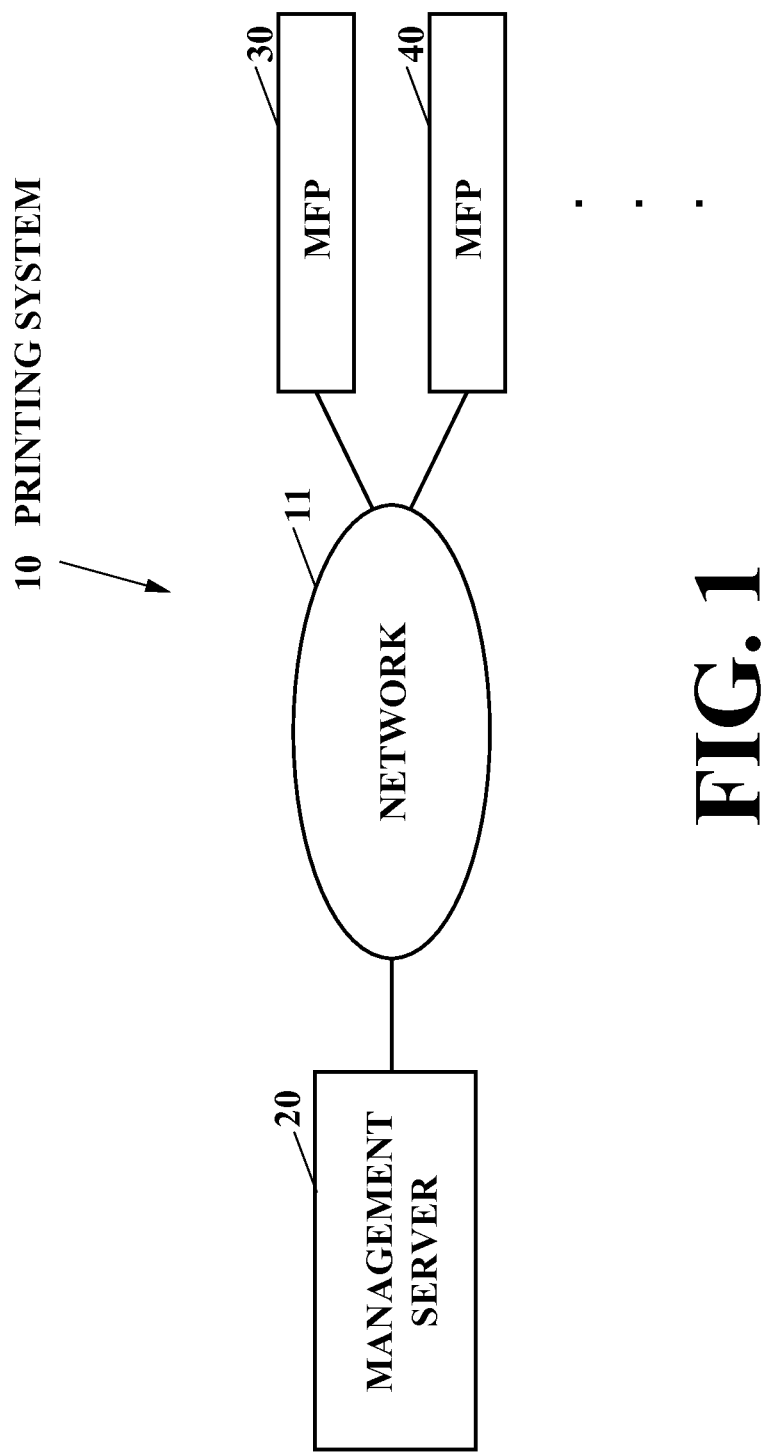
FIG. 1 is a block diagram illustrating a configuration of a printing system according to a first embodiment of the present disclosure.

FIG. 1 is a block diagram illustrating a configuration of a printing system 10 according to a first embodiment of the present disclosure. As illustrated in FIG. 1, a printing system 10 includes a management server 20 that manages users and a plurality of MFPs including MFPs 30 and 40. The management server 20 and the plurality of MFPs are communicably connected to each other via a network 11 such as a local area network (LAN) or the Internet.

Note that each of the plurality of MFPs included in the printing system 10 have the same configuration as the MFP 30. Therefore, the MFP 30 is described below as being representative of each of the plurality of MFPs included in the printing system 10.

Figure 2:
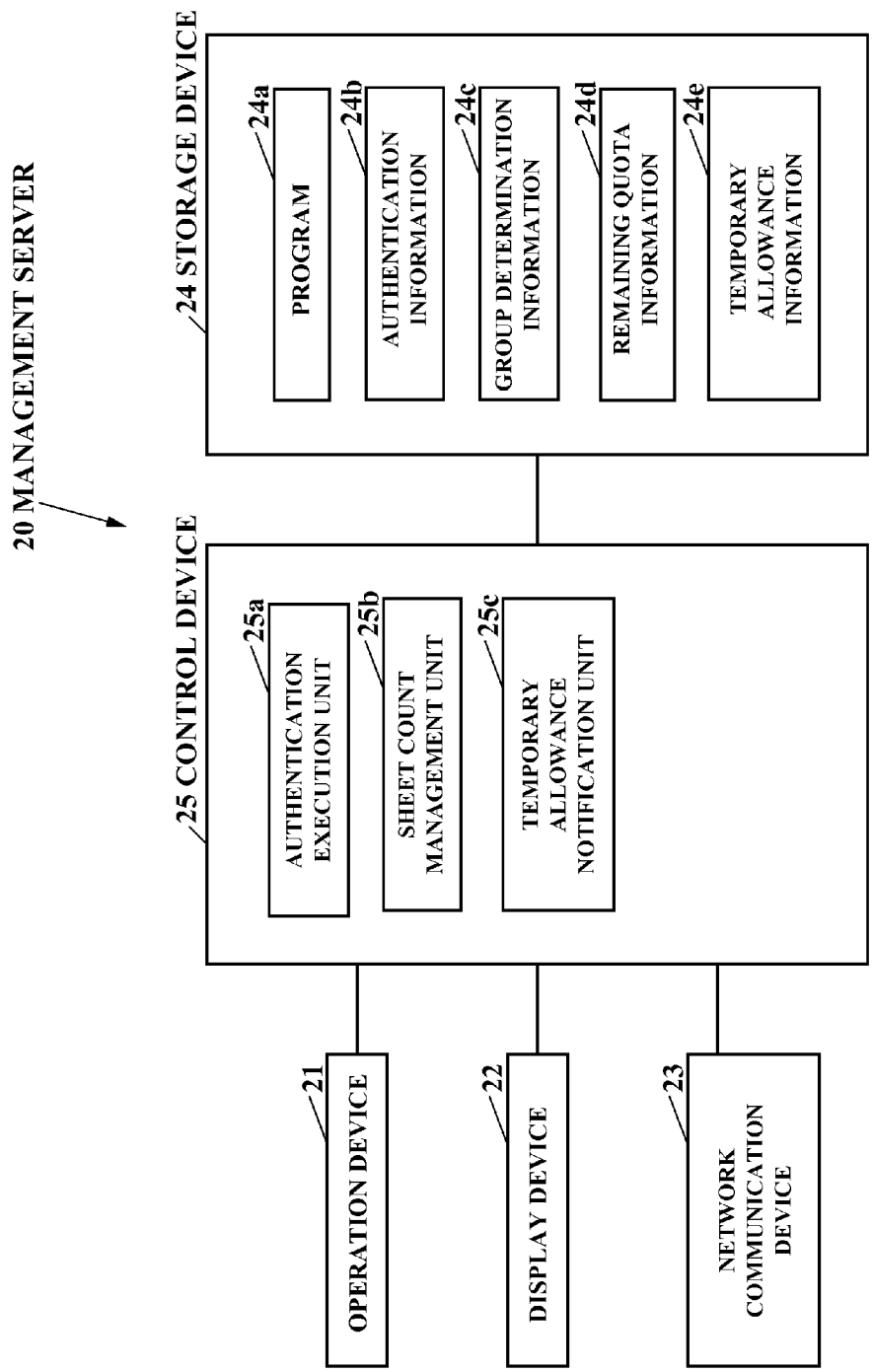
FIG. 2 is a block diagram illustrating a configuration of a management server included in the printing system.

FIG. 2 is a block diagram illustrating a configuration of the management server 20. As illustrated in FIG. 2, the management server 20 includes an operation device 21, a display device 22, a network communication device 23, a storage device 24, and a control device 25. The operation device 21 includes an input device, such as a mouse or a keyboard, via which various operations are input. A display device 22 includes a device for display, such as a liquid crystal display (LCD), that displays various kinds of information. A network communication device 23 includes a device for network communications that performs communications to/from an external device via the network 11 illustrated in FIG. 1. The storage device 24 includes a device for storage, such as a hard disk drive (HDD), that stores programs and different kinds of data. The control device 25 controls the entire management server 20. The management server 20 is made up of a computer, such as a personal computer (PC).

The storage device 24 stores a program 24a for the management server 20, and authentication information 24b for authenticating a user. The storage device 24 further stores group determination information 24c for determining a group to which the user belongs, remaining quota information 24d being information on a remaining quota that represents a remaining number of print sheets allocated to the group, and temporary allowance information 24e that represents a number of print sheets temporarily allowed for each user.

The program 24a may be installed into the management server 20 at a stage of manufacturing. The management server 20 may be additionally installed into the management server 20 from a storage medium such as a compact disc (CD) or a digital versatile disc (DVD), or may be additionally installed into the management server 20 from the network 11.

The authentication information 24b stores combinations of a user ID being identification information on the user and a password thereof.

Figure 3:
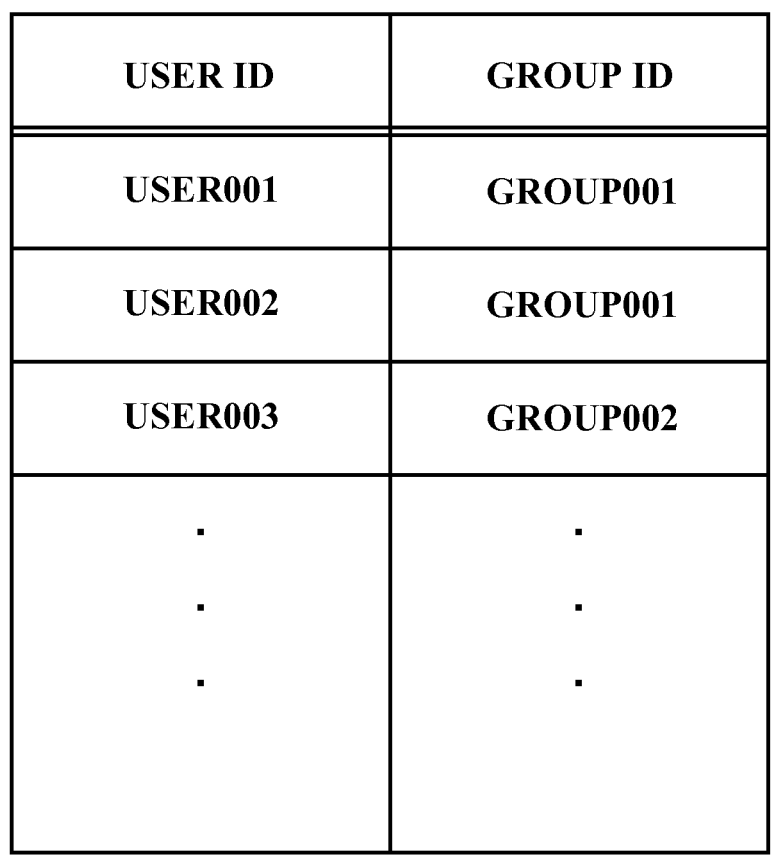
FIG. 3 is a schematic diagram illustrating an example of group determination information used in the management server.

FIG. 3 is a schematic diagram illustrating an example of the group determination information 24c. As illustrated in FIG. 3, the group determination information 24c stores combinations of the user ID and a group ID being identification information on the group to which the user associated with the user ID belongs. For example, in FIG. 3, the group ID of the group to which a user having a user ID of "USER001" belongs is "GROUP001".

Figure 4:
FIG. 4 is a tabular diagram illustrating an example of remaining quota information used in the management server.

FIG. 4 is a tabular diagram illustrating an example of the remaining quota information 24d. As illustrated in FIG. 4, the remaining quota information 24d stores combinations of the group ID and the remaining quota of the group associated with the group ID. For example, in FIG. 4, the remaining quota of a group having a group ID of "GROUP001" is 100 sheets.

FIG. 5 is a tabular diagram illustrating an example of the temporary allowance information 24e. As illustrated in FIG. 5, the temporary allowance information 24e stores combinations of the user ID and the temporary allowance of the user associated with the user ID. For example, in FIG. 5, the temporary allowance of a user having a user ID of "USER003" is 60 sheets.

The control device 25 illustrated in FIG. 2 is provided with, for example, a central processing unit (CPU), a read only memory (ROM) that stores in advance programs and different kinds of data, and a random access memory (RAM) used as a work area for the CPU. The CPU is configured to execute the programs stored in the ROM or the storage device 24.

The control device 25 executes the program 24a, to thereby function as i) an authentication execution unit 25a that executes an authentication of a user for a login of the user, ii) a sheet count management unit 25b that manages the remaining quota of the group and the temporary allowance for each user, and iii) a temporary allowance notification unit 25c that notifies the MFP of the temporary allowance reserved by the sheet count management unit 25b.

Figure 6:
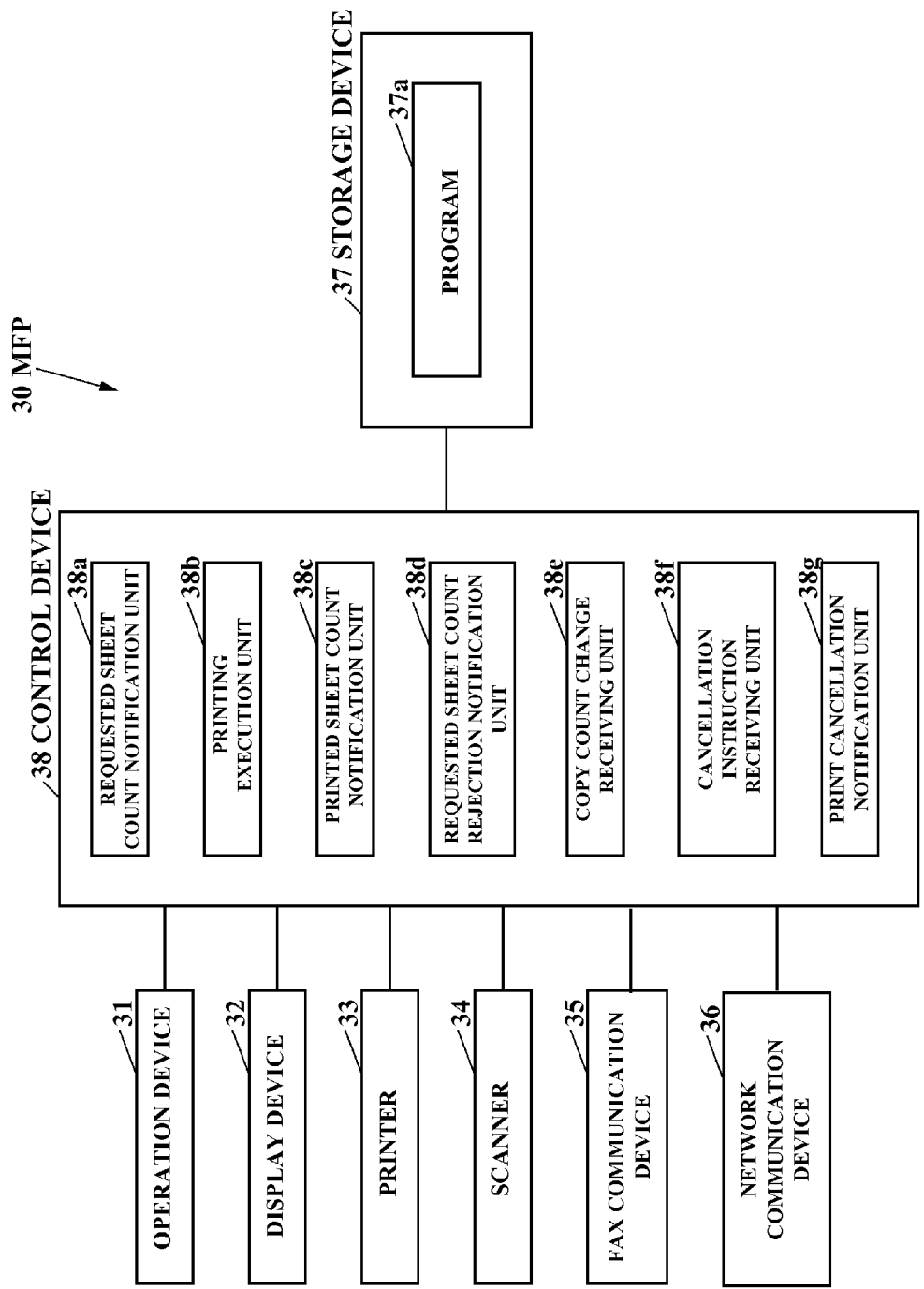
FIG. 6 is a block diagram illustrating a configuration of a multifunction peripheral (MFP) used in the printing system.

FIG. 6 is a block diagram of the MFP 30. As illustrated in FIG. 6, the MFP 30 includes an operation device 31, a display device 32, a printer 33, a scanner 34, a FAX communication device 35, a network communication device 36, a storage device 37, and a control device 38. The operation device 31 includes an input device, such as buttons, via which various operations are input by the user. The display device 32 includes a device for display, such as an LCD, that displays various kinds of information. The printer 33 includes a printing device that executes printing on paper. The scanner 34 includes a reading device that reads an image from an original. The FAX communication device 35 includes a FAX device that performs FAX communications to/from an external facsimile machine (not illustrated) via a communication line, such as a public telephone line. The network communication device 36 includes a device for network communications that performs communications to/from the external device via the network 11 illustrated in FIG. 1. The storage device 37 includes a device for storage, such as an electrically erasable programmable read only memory (EEPROM), that stores different kinds of data. The control device 38 controls the entire MFP 30.

The storage device 37 stores a program 37a for the MFP 30. The program 37a for the image forming apparatus may be installed into the MFP 30 at a stage of manufacturing the MFP 30, from a storage medium such as a universal serial bus (USB) memory or an SD card, or from the network 11.

The control device 38 is provided with, for example, a CPU, a ROM that stores in advance programs and different kinds of data, and a RAM used as a work area for the CPU. The CPU is configured to execute the programs stored in the ROM or the storage device 37.

The control device 38 executes the program 37a to thereby function as i) a requested sheet count notification unit 38a that notifies the management server 20 of a requested sheet count that represents a sheet count based on an instruction for printing, and is a number of print sheets for which permission is requested from the management server 20 illustrated in FIG. 2, ii) a printing execution unit 38b that executes the printing within a range of the temporary allowance notified of by the management server 20, iii) a printed sheet count notification unit 38c that notifies the management server 20 of a printed sheet count that represents a number of sheets for which the printing has been executed by the printing execution unit 38b, iv) a requested sheet count rejection notification unit 38d that notifies that the printing for the requested sheet count cannot be executed, v) a copy count change receiving unit 38e that receives a change of a number of print copies made by the user, vi) a cancellation instruction receiving unit 38f that receives an instruction to cancel the printing issued by the user, and vii) a print cancellation notification unit 38g that notifies the management server 20 of cancellation of the printing.

Figure 7:
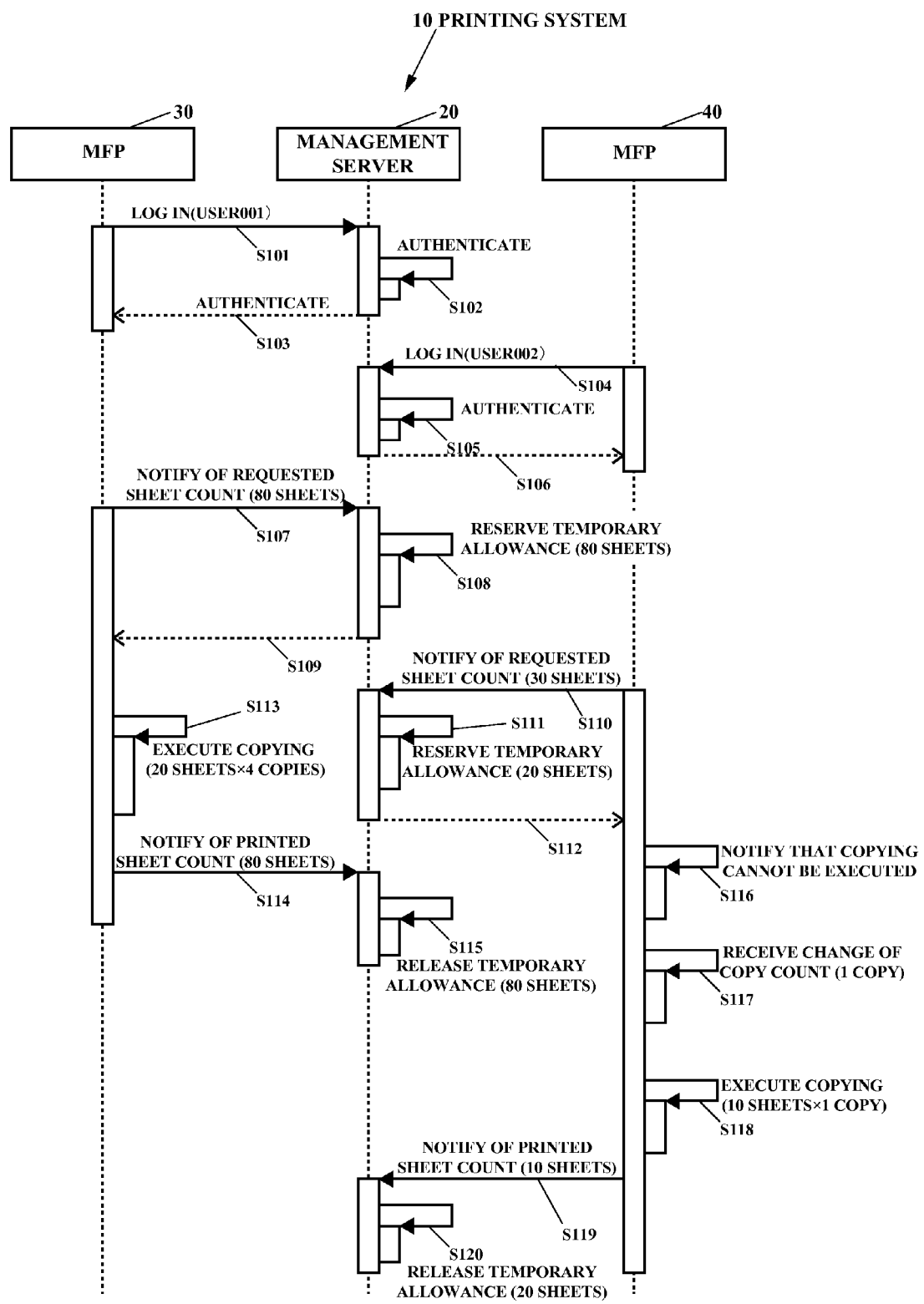
FIG. 7 is a sequence diagram illustrating an example of an operation of the printing system.

FIG. 7 is a sequence diagram illustrating an example of an operation of the printing system 10. When the user having the user ID of "USER001" instructs the MFP 30 for a login process by inputting the combination of the user ID "USER001" and the password to the operation device 31 of the MFP 30, as illustrated in FIG. 7, the control device 38 of the MFP 30 requests the management server 20 to process the user login by notifying the management server 20 of the combination of the user ID and the password input by the user via the network communication device 36 (S101).

When receiving the request for the login process made in S101 via the network communication device 23, the authentication execution unit 25a of the control device 25 of the management server 20 executes the authentication of the user for the login of the user based on the received combination of the user ID and the password and the authentication information 24b stored on the storage device 24 (S102). In this case, the authentication execution unit 25a determines that the authentication of the user is successful when the combination of the user ID and the password received in S101 is included in the authentication information 24b stored on the storage device 24.

Subsequently, when the authentication is successful in S102, the authentication execution unit 25a notifies the MFP 30 of an authentication ticket being information indicating that the authentication is successful via the network communication device 23 (S103). The authentication ticket includes information indicating that the user having the user ID of "USER001" is using the MFP 30.

When a user having a user ID of "USER002" instructs the MFP 40 for the login process by inputting the combination of the user ID "USER002" and the password to an operation device of the MFP 40, a control device of the MFP 40 requests the management server 20 to process the login of the user by notifying the management server 20 of the combination of the user ID and the password input by the user via a network communication device of the MFP 40 (S104).

When receiving the request for the login process made in S104 via the network communication device 23, the authentication execution unit 25a executes the authentication of the user for the login of the user based on the received combination of the user ID and the password and the authentication information 24b stored on the storage device 24 (S105). In this case, the authentication execution unit 25a determines that the authentication of the user is successful when the combination of the user ID and the password received in S104 is included in the authentication information 24b stored on the storage device 24.

Subsequently, when the authentication is successful in S105, the authentication execution unit 25a notifies the MFP 40 of the authentication ticket via the network communication device 23 (S106). The authentication ticket includes the information indicating that the user having the user ID of "USER002" is using the MFP 40.

After placing a 20-sheet original on an automatic original feeder (not illustrated) of the scanner 34 of the MFP 30, when the user having the user ID of "USER001" instructs the MFP 30 to perform copying by setting four copies as a number of copies to be subjected to the copying via the operation device 31 of the MFP 30, the requested sheet count notification unit 38a determines that the original placed on the automatic original feeder has 20 sheets by causing the scanner 34 to automatically read the image from the original on the automatic original feeder. Then, the requested sheet count notification unit 38a notifies the management server 20 of the requested sheet count of four copies of 20 sheets, in other words, 80 sheets in total and the authentication ticket notified of by the management server 20 in S103 via the network communication device 36 (S107).

When receiving the notification performed in S107 via the network communication device 23, the sheet count management unit 25b reserves the temporary allowance of the user included in the received authentication ticket; in other words, the user having the user ID of "USER001" who has logged in to the MFP 30 (S108). Specifically, the sheet count management unit 25b executes the operation illustrated in FIG. 8.

Figure 8:
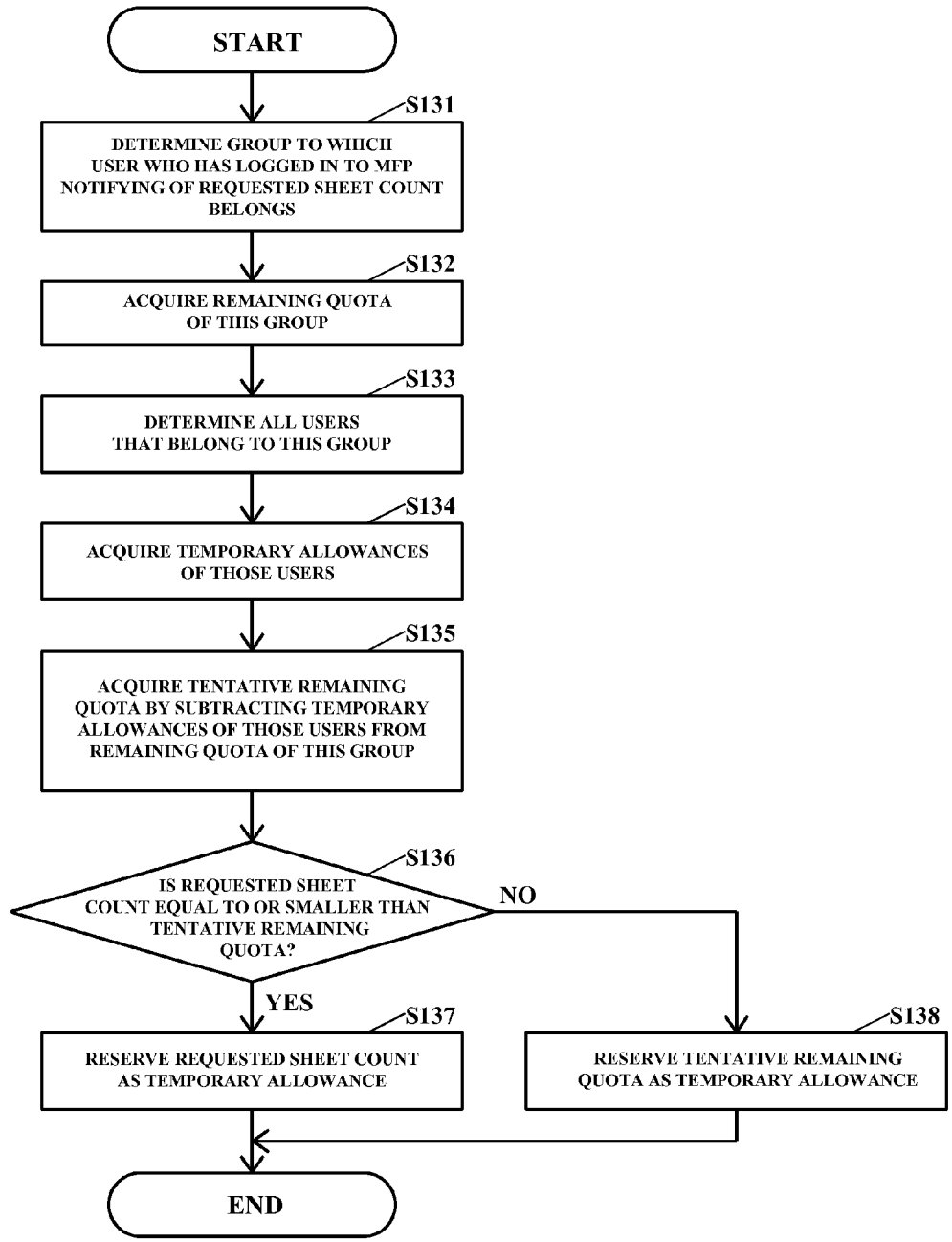
FIG. 8 is a flowchart illustrating an operation of the management server performed in a case of reserving a temporary allowance of a user.

FIG. 8 is a flowchart illustrating an operation of the management server 20 in a case of reserving the temporary allowance of the user. As illustrated in FIG. 8, the sheet count management unit 25b determines the group to which a user who has logged in to the MFP notifying of the requested sheet count belongs based on the group determination information 24c (S131). For example, the sheet count management unit 25b determines the group to which the user having the user ID of "USER001" belongs as the group having the group ID of "GROUP001" based on the group determination information 24c.

Subsequently, the sheet count management unit 25b acquires the remaining quota of the group determined in S131 based on the remaining quota information 24d (S132). For example, the sheet count management unit 25b acquires 100 sheets as the remaining quota of the group having the group ID of "GROUP001" based on the remaining quota information 24d.

Subsequently, the sheet count management unit 25b determines all the users that belong to the group determined in S131 based on the group determination information 24c (S133). For example, the sheet count management unit 25b determines all the users that belong to the group having the group ID of "GROUP001" based on the group determination information 24c.

Subsequently, the sheet count management unit 25b acquires the temporary allowances of all the users determined in S133 based on the temporary allowance information 24e (S134).

Subsequently, the sheet count management unit 25b acquires a tentative remaining quota by subtracting all the temporary allowances acquired in S134 from the remaining quota acquired in S132 (S135).

Subsequently, the sheet count management unit 25b determines whether or not the requested sheet count is equal to or smaller than the tentative remaining quota acquired in S135 (S136).

When determining in S136 that the requested sheet count is equal to or smaller than the tentative remaining quota, the sheet count management unit 25b reserves the requested sheet count as the temporary allowance (S137). In other words, the sheet count management unit 25b updates the temporary allowance information 24e so that the temporary allowance of the user who has logged in to the MFP notifying of the requested sheet count becomes the requested sheet count.

On the other hand, when determining in S136 that the requested sheet count exceeds the tentative remaining quota, the sheet count management unit 25b reserves the tentative remaining quota as the temporary allowance (S138). In other words, the sheet count management unit 25b updates the temporary allowance information 24e so that the temporary allowance of the user who has logged in to the MFP notifying of the requested sheet count becomes the tentative remaining quota.

After finishing the process of S137 or S138, the sheet count management unit 25b brings the operation illustrated in FIG. 8 to an end.

In S108 illustrated in FIG. 7, the temporary allowances of all the users that belong to the group having the group ID of "GROUP001" are assumed as zero sheets, and the remaining quota of this group is assumed as 100 sheets. In other words, the tentative remaining quota obtained by subtracting zero sheets, which is a sum of the temporary allowances of all the users that belong to the group having the group ID of "GROUP001", from 100 sheets, which is the remaining quota of this group, is 100 sheets (S135). Therefore, in S108, 80 sheets (the requested sheet count) is equal to or smaller than 100 sheets (the tentative remaining quota) (YES in S136), and hence, 80 sheets (the requested sheet count) are reserved as the temporary allowance (S137).

The temporary allowance notification unit 25c of the control device 25 of the management server 20 notifies the MFP 30 of the temporary allowance reserved in S108 via the network communication device 23 (S109).

After placing a 10-sheet original on an automatic original feeder (not illustrated) of a scanner of the MFP 40, when the user having the user ID of "USER002" instructs the MFP 40 to perform copying by setting three copies as the number of copies to be subjected to the copying via the operation device of the MFP 40, a requested sheet count notification unit of the control device of the MFP 40 determines that the original placed on the automatic original feeder has 10 sheets by causing the scanner of the MFP 40 to automatically read the image from the original placed on the automatic original feeder. Then, the requested sheet count notification unit notifies the management server 20 of the requested sheet count of three copies of 10 sheets, in other words, 30 sheets in total and the network communication device of the MFP 40 (S110) provides the management server 20 with the authentication ticket in S106.

When receiving the notification performed in S110 via the network communication device 23, the sheet count management unit 25b reserves the temporary allowance of the user included in the received authentication ticket, in other words, the user having the user ID of "USER002" who has logged in to the MFP 40 (S111). Specifically, the sheet count management unit 25b executes the operation illustrated in FIG. 8.

In S111 illustrated in FIG. 7, the temporary allowance of the user having the user ID of "USER001" is reserved as 80 sheets in S108, and hence, the tentative remaining quota obtained by subtracting 80 sheets (the sum of the temporary allowances of all the users that belong to the group having the group ID of "GROUP001") from 100 sheets (the remaining quota of this group) is 20 sheets (S135). Therefore, in S111, 30 sheets (the requested sheet count) exceed 20 sheets (the tentative remaining quota) (NO in S136), and hence, 20 sheets (the tentative remaining quota) are reserved as the temporary allowance (S138).

The temporary allowance notification unit 25c notifies the MFP 40 of the temporary allowance reserved in S111 via the network communication device 23 (S112).

The printing execution unit 38b of the control device 38 of the MFP 30 executes the copying for the requested sheet count of which the management server 20 is notified in S107 (S113) because 80 sheets (the requested sheet count of which the management server 20 is notified in S107) falls within the range of 80 sheets (the temporary allowance notified of by the management server 20 in S109). In other words, the printing execution unit 38b executes the printing for four copies based on images corresponding to 20 sheets read by the scanner 34 immediately before the requested sheet count is notified of in S107, i.e., the printing for 80 sheets.

Subsequently, the printed sheet count notification unit 38c of the control device 38 of the MFP 30 notifies the management server 20 of 80 sheets being the printed sheet count obtained in S113 and the authentication ticket notified of by the management server 20 in S103 via the network communication device 36 (S114).

When receiving the notification performed in S114 via the network communication device 23, the sheet count management unit 25b of the control device 25 of the management server 20 releases the temporary allowance of the user included in the received authentication ticket, i.e., the temporary allowance associated with the user ID of the user who has logged in to the MFP 30 (S115). Specifically, the sheet count management unit 25b executes the operation illustrated in FIG. 9.

Figure 9:
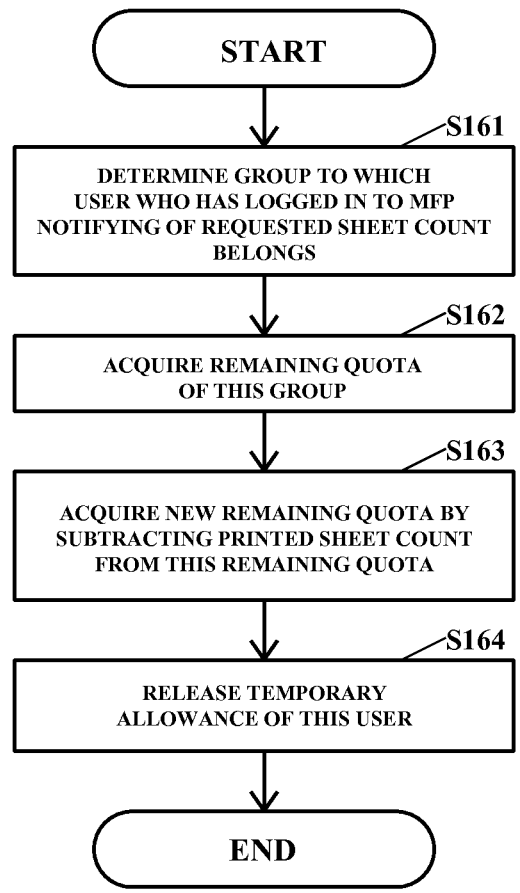
FIG. 9 is a flowchart illustrating the operation of the management server performed in a case of releasing the temporary allowance of the user.

FIG. 9 is a flowchart illustrating the operation of the management server 20 in a case of releasing the temporary allowance of the user. As illustrated in FIG. 9, the sheet count management unit 25b determines the group to which the user who has logged in to the MFP notifying of the printed sheet count belongs based on the group determination information 24c stored on the storage device 24 (S161). For example, the sheet count management unit 25b determines the group to which the user having the user ID of "USER001" belongs to the group having the group ID of "GROUP001" based on the group determination information 24c stored on the storage device 24.

Subsequently, the sheet count management unit 25b acquires the remaining quota of the group determined in S161 based on the remaining quota information 24d stored on the storage device 24 (S162). For example, the sheet count management unit 25b acquires 100 sheets as the remaining quota of the group having the group ID of "GROUP001" based on the remaining quota information 24d stored on the storage device 24.

Subsequently, the sheet count management unit 25b acquires a new remaining quota by subtracting the printed sheet count from the remaining quota acquired in S162 (S163). In other words, the sheet count management unit 25b updates the remaining quota information 24d stored on the storage device 24 so that the remaining quota of the group to which the user who has logged in to the MFP notifying of the printed sheet count belongs becomes a new remaining quota.

Subsequently, the sheet count management unit 25b releases the temporary allowance of the user who has logged in to the MFP notifying of the printed sheet count (S164). In other words, the sheet count management unit 25b updates the temporary allowance information 24e stored on the storage device 24 so that the temporary allowance reserved for the user who has logged in to the MFP notifying of the printed sheet count becomes zero sheets.

After finishing the process of S164, the sheet count management unit 25b brings the operation illustrated in FIG. 9 to an end.

In S115 illustrated in FIG. 7, the remaining quota of the group having the group ID of "GROUP001" is 100 sheets, while the printed sheet count notified of in S114 is 80 sheets, and hence the new remaining quota is 20 sheets (S163). Further, in S115, the temporary allowance reserved for the user having the user ID of "USER001" in S108 is changed from 80 sheets to zero sheets (S164).

A requested sheet count rejection notification unit of the control device of the MFP 40 notifies that the printing for the requested sheet count cannot be executed. In other words, the copying cannot be executed via display on a display device of the MFP 40 as illustrated in FIG. 10 (S116) because 30 sheets (the requested sheet count of which the management server 20 is notified in S110) falls out of the range of 20 sheets (the temporary allowance notified of by the management server 20 in S112).

Figure 10:
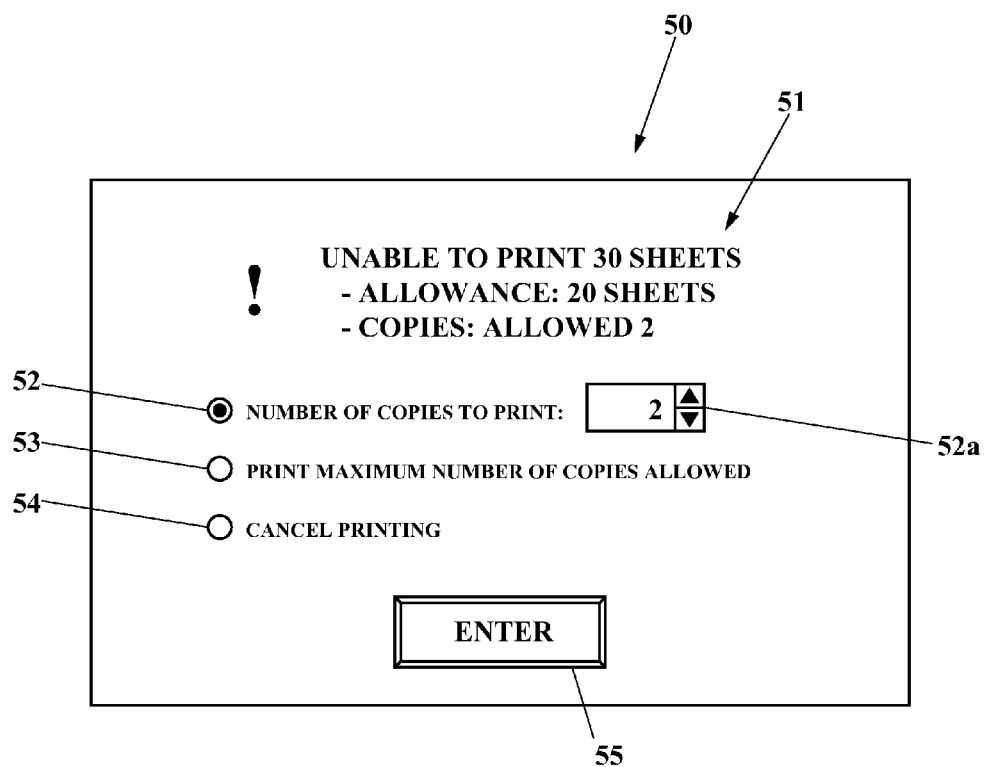
FIG. 10 is a drawing illustrating an example of a screen that notifies that printing for a requested sheet count cannot be executed via display on a display device of the MFP.

FIG. 10 is a drawing illustrating an example of a screen 50 that notifies that the printing for the requested sheet count cannot be executed via the display on the display device of the MFP 40. In FIG. 10, the screen 50 includes a message 51 that indicates that the printing for the requested sheet count cannot be executed, a radio button 52 for selecting to execute the printing by changing the copy count, a spin box 52a for designating the copy count when the radio button 52 is selected, a radio button 53 for selecting to execute the printing the maximum sheet count being allowed, a radio button 54 for selecting to cancel the execution of the printing, and an execution button 55 for executing process selected by the radio button 52, 53, or 54.

The radio button 52 is grayed out when the sheet count (of the requested sheet count in a case where the copy count is one copy) exceeds the temporary allowance. The spin box 52a enables designation of the copy count of at least one copy. The spin box 52a enables the designation of the copy count equal to or smaller than such a copy count that the total number of print sheets is equal to or smaller than the temporary allowance. The radio button 53 is grayed out when the temporary allowance is zero sheets. The radio buttons 52, 53, and 54 are configured to have only any one thereof selected.

When the execution button 55 is pressed with the radio button 52 selected on the screen 50 displayed in S116 as illustrated in FIG. 10 by the user via the operation device of the MFP 40, as illustrated in FIG. 7, a copy count change receiving unit of the control device of the MFP 40 receives a change to the copy count designated by the spin box 52a on the screen 50 (i.e. a copy count that the sheet count for which the printing is executed by a printing execution unit of the control device of the MFP 40 falls within the range of the temporary allowance notified of by the management server 20 (S117)).

Subsequently, the printing execution unit of the control device of the MFP 40 executes the printing (i.e. executes the copying) for the copy count whose change has been received by the copy count change receiving unit (S118). For example, when the copy count whose change has been received by the copy count change receiving unit is one copy, the printing execution unit executes the printing for one copy based on images corresponding to 10 sheets read by the scanner of the MFP 40 immediately before the requested sheet count is notified of in S110.

Subsequently, a printed sheet count notification unit of the control device of the MFP 40 notifies the management server 20 of 10 sheets (the printed sheet count) in S118 and the authentication ticket notified of by the management server 20 in S106 via the network communication device of the MFP 40 (S119).

When receiving the notification performed in S119 via the network communication device 23, the sheet count management unit 25b of the control device 25 of the management server 20 releases the temporary allowance of the user included in the received authentication ticket (i.e., the temporary allowance associated with the user ID of the user who has logged in to the MFP 30) (S120). Specifically, the sheet count management unit 25b executes the operation illustrated in FIG. 9.

In S120 illustrated in FIG. 7, the new remaining quota is 10 sheets (S163) because the remaining quota of the group having the group ID of "GROUP001" is changed to 20 sheets in S115 and the printed sheet count notified of in S119 is 10 sheets. Further, in S120, the temporary allowance reserved for the user having the user ID of "USER002" in S111 is changed from 20 sheets to zero sheets (S164).

Figure 11:
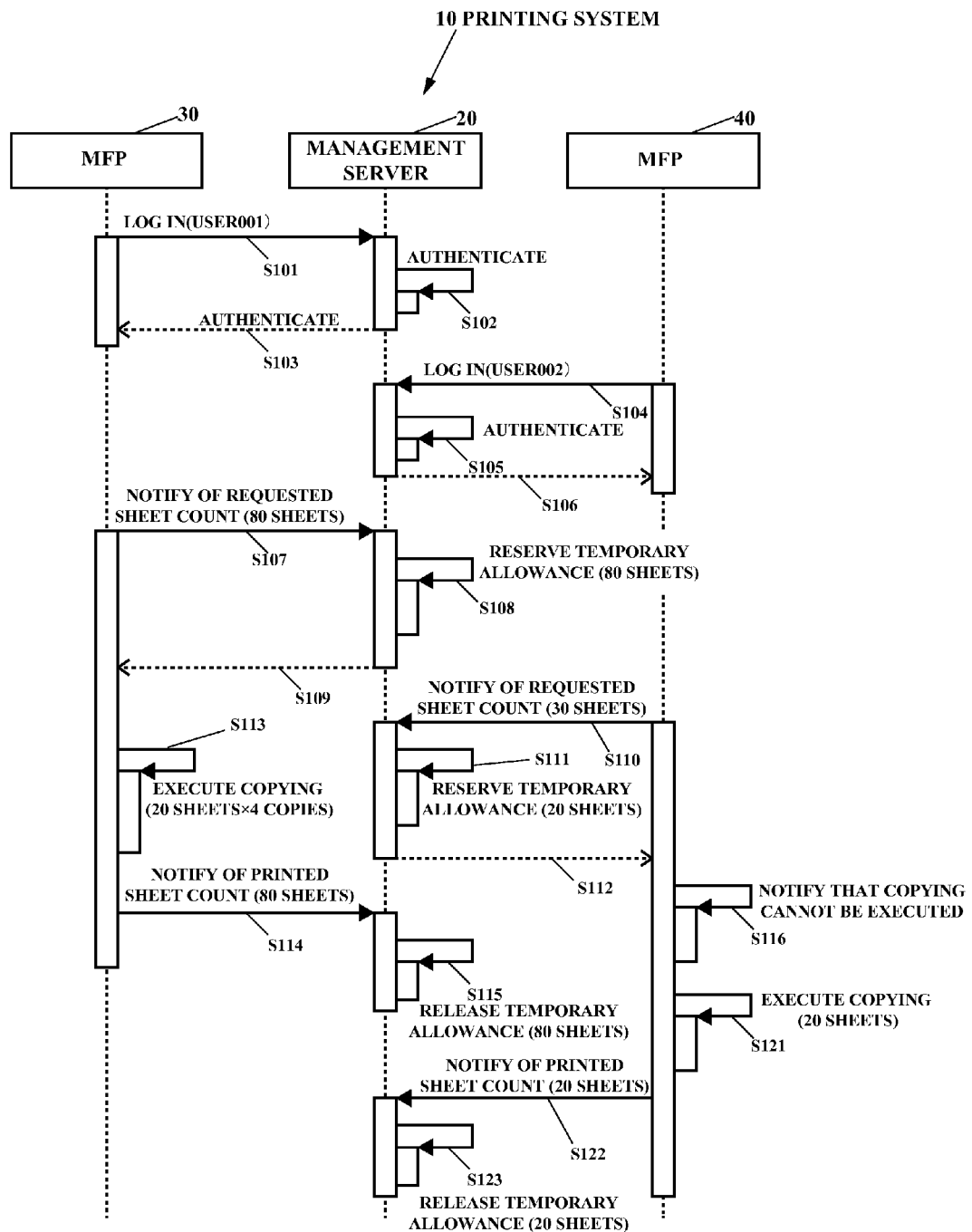
FIG. 11 is a sequence diagram illustrating another example of the operation of the printing system.

When the execution button 55 is pressed with the radio button 53 selected on the screen 50 displayed in S116 as illustrated in FIG. 10 by the user via the operation device of the MFP 40, as illustrated in FIG. 11, the printing execution unit of the control device of the MFP 40 executes the copying for 20 sheets (the temporary allowance notified of by the management server 20 in S112) (S121). In other words, the printing execution unit executes the printing for two copies based on the images corresponding to 10 sheets read by the scanner of the MFP 40 immediately before the requested sheet count is notified of in S110. Thus, 20 sheets are to be printed. In this case, the printing execution unit executes the printing for each copy, and hence, when the temporary allowance cannot be divided by the sheet count in the case where the copy count is one copy, the printing for the last copy can be executed only partially via the sheet count. For example, when the sheet count in the case where the copy count is one copy is 10 sheets and the temporary allowance is 24 sheets, the printing execution unit can execute the printing only up to the fourth sheets for the last copy, in other words, the third copy.

Subsequently, the printed sheet count notification unit of the control device of the MFP 40 notifies the management server 20 of 20 sheets being the printed sheet count in S121 and the authentication ticket notified of by the management server 20 in S106 via the network communication device of the MFP 40 (S122).

When receiving the notification performed in S122 via the network communication device 23, the sheet count management unit 25b of the control device 25 of the management server 20 releases the temporary allowance of the user included in the received authentication ticket (i.e. the temporary allowance associated with the user ID of the user who has logged in to the MFP 40) (S123). Specifically, the sheet count management unit 25b executes the operation illustrated in FIG. 9.

In S123 illustrated in FIG. 11, the new remaining quota is zero sheets (S163) because the remaining quota of the group having the group ID of "GROUP001" is changed to 20 sheets in S115 and the printed sheet count notified of in S122 is 20 sheets. Further, in S123, the temporary allowance reserved for the user having the user ID of "USER002" in S111 is changed from 20 sheets to zero sheets (S164).

Figure 12:
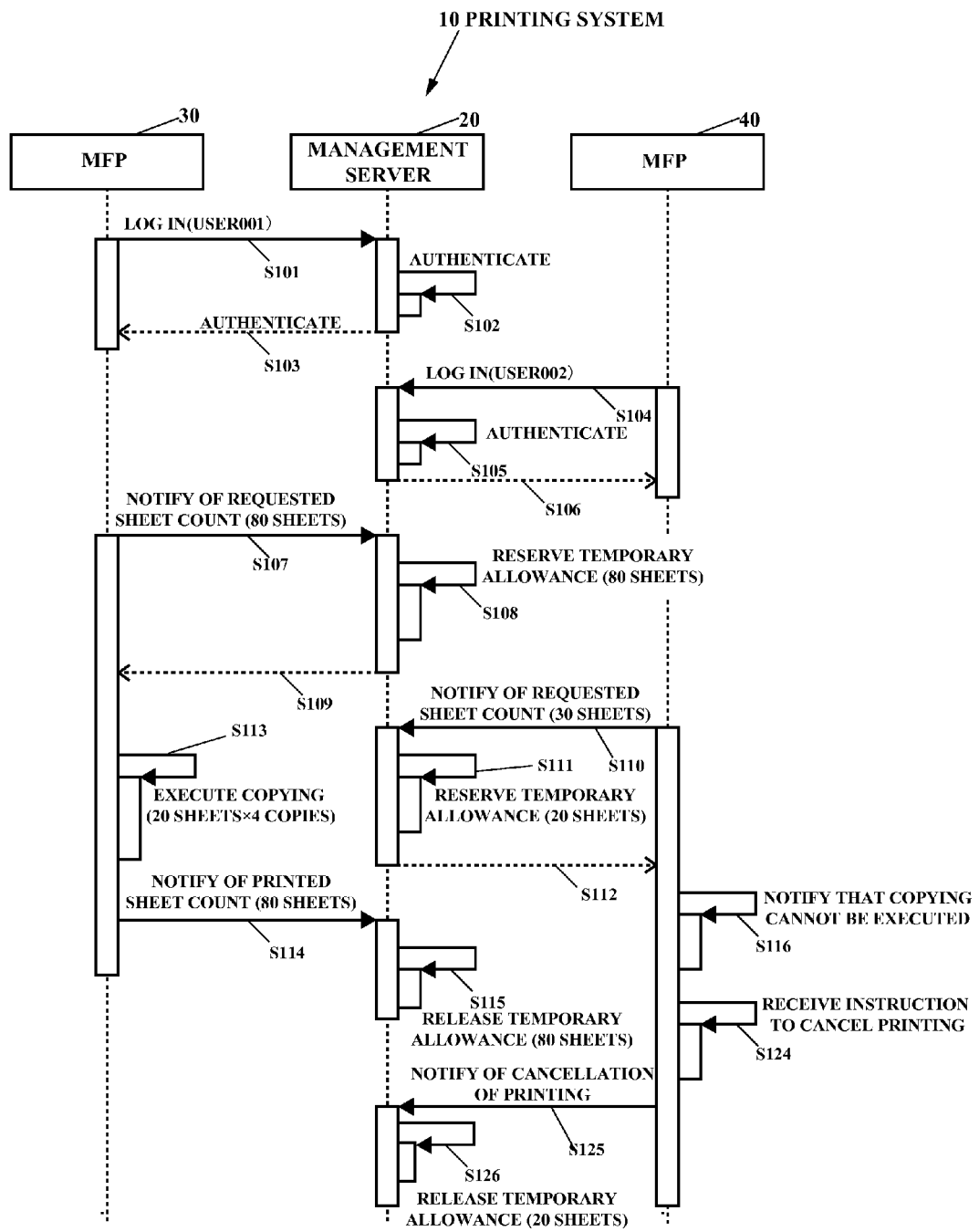
FIG. 12 is a sequence diagram illustrating further another example of the operation of the printing system.

When the execution button 55 is pressed with the radio button 54 selected on the screen 50 displayed in S116 as illustrated in FIG. 10 by the user via the operation device of the MFP 40, as illustrated in FIG. 12, a cancellation instruction receiving unit of the control device of the MFP 40 receives the instruction to cancel the printing based on the radio button 54 (S124).

Subsequently, a print cancellation notification unit of the control device of the MFP 40 notifies the management server 20 of cancellation of the printing and the authentication ticket notified of by the management server 20 in S106 via the network communication device of the MFP 40 (S125).

When receiving the notification performed in S125 via the network communication device 23, the sheet count management unit 25b of the control device 25 of the management server 20 releases the temporary allowance of the user included in the received authentication ticket (i.e., the temporary allowance associated with the user ID of the user who has logged in to the MFP 40) (S126). In other words, the temporary allowance reserved for the user having the user ID of "USER002" in S111 is changed from 20 sheets to zero sheets.

As described above, in the printing system 10, the MFP requests permission for the sheet count based on the instruction for printing from the management server 20 (S107 and S110), and based on this sheet count, the management server 20 reserves the temporary allowance (S108 and S111), which can prevent the printing from being partially finished against the user's will.

Further, when the printing for the sheet count requested by the user cannot be executed, the printing system 10 notifies to that effect (S116), which allows the user to recognize that the printing for the sheet count requested by the user cannot be executed.

Further, when the printing for the sheet count requested by the user cannot be executed, the printing system 10 executes the printing for close to the copy count wished for by the user (S117 and S118), to thereby be able to prevent the printing from being partly finished against the user's will.

Further, when the printing for the sheet count requested by the user cannot be executed and the user wishes to cancel the printing, the printing system 10 cancels the execution of the printing (S124 and S125), to thereby be able to prevent the printing from being finished halfway against the user's will.

Second Embodiment

A printing system according to a second embodiment of the present disclosure has the same configuration as that of the printing system 10 according to the first embodiment illustrated in FIG. 1. Therefore, the same reference symbols are used for the second embodiment as were used for the first embodiment, and detailed descriptions thereof are omitted.

Figure 13:
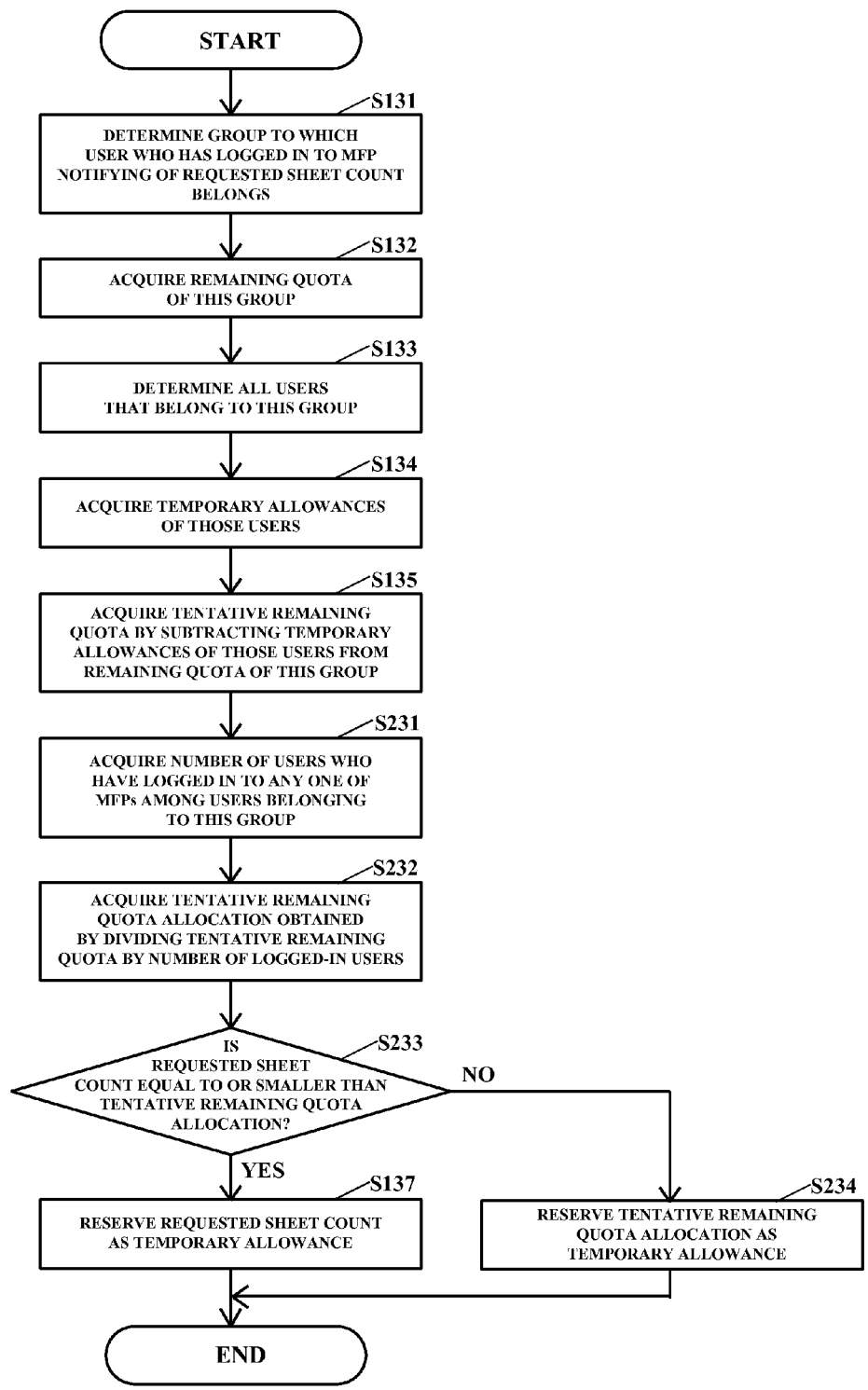
FIG. 13 is a flowchart illustrating an operation of a management server included in a printing system according to a second embodiment of the present disclosure in the case of reserving the temporary allowance of the user.

The operation of the printing system according to this embodiment is the same as the operation of the printing system 10 except that the operation illustrated in FIG. 13 is executed in place of the operation illustrated in FIG. 8.

FIG. 13 is a flowchart of the operation of the management server 20 in the case of reserving the temporary allowance of the user.

As illustrated in FIG. 13, the sheet count management unit 25b executes the process of Steps S131 to S135 in the same manner as in the operation illustrated in FIG. 8.

Then, the sheet count management unit 25b acquires the number of users who have logged in to any one of the MFPs within the printing system according to this embodiment among all the users determined in S133 (S231).

Subsequently, the sheet count management unit 25b acquires a tentative remaining quota allocation, which is the sheet count obtained by dividing the tentative remaining quota acquired in S135 by the number of users acquired in S231 (S232). For example, when the tentative remaining quota acquired in S135 is 100 sheets and the number of users acquired in S231 is two users, the tentative remaining quota allocation is 50 sheets.

Subsequently, the sheet count management unit 25b determines whether or not the requested sheet count is equal to or smaller than the tentative remaining quota allocation acquired in S232 (S233).

When determining in S233 that the requested sheet count is equal to or smaller than the tentative remaining quota allocation, the sheet count management unit 25b executes the process of S137 in the same manner as in the operation illustrated in FIG. 8.

On the other hand, when determining in S233 that the requested sheet count exceeds the tentative remaining quota allocation, the sheet count management unit 25b reserves the tentative remaining quota allocation as the temporary allowance (S234). In other words, the sheet count management unit 25b updates the temporary allowance information 24e stored on the storage device 24 so that the temporary allowance of the user who has logged in to the MFP notifying of the requested sheet count becomes the tentative remaining quota allocation.

After finishing the process of S137 or S234, the sheet count management unit 25b ends the operation illustrated in FIG. 13.

As described above, compared to such a configuration as to preferentially reserve the temporary allowance of the user who has logged in to the MFP notifying of the requested sheet count earlier, in other words, the configuration of the printing system 10 according to the first embodiment, the printing system according to this embodiment can reserve the temporary allowance of the user who has logged in to any one of the MFPs within the printing systems among the users belonging to the same group with more fairness.

The printing system according to each of the embodiments includes the MFPs as the image forming apparatus, but may include image forming apparatus other than the MFPs, such as stand-alone copiers.

What is claimed is:

1. A printing system, comprising a management server and an image forming apparatus that are connected to a network, the management server comprising:
   an authentication execution unit configured to authenticate a logged-in user of the image forming apparatus;
   a sheet count management unit configured to i) manage a remaining quota that represents a remaining number of print sheets allocated to a group to which the logged-in user belongs and a temporary allowance that represents a number of print sheets temporarily allowed for every user that belongs to the group, and ii) reserve, when the image forming apparatus provides a notification including a requested sheet count that represents a sheet count based on an instruction for printing and is a number of print sheets for which permission is requested to the management server, the temporary allowance of the logged-in user based on the requested sheet count and the sheet count obtained by dividing a tentative remaining quota, which is obtained by subtracting the temporary allowances of all the users belonging to the group from the remaining quota of the group to which the logged-in user belongs, by a number of users who have logged in to any one of the image forming apparatus within the printing system among the users belonging to the group; and a temporary allowance notification unit configured to provide a notification including the temporary allowance to the image forming apparatus, the image forming apparatus comprising:

a requested sheet count notification unit configured to provide the notification including the requested sheet count to the management server;

a printing execution unit configured to print within a range of the temporary allowance notified of by the management server; and a printed sheet count notification unit configured to provide a notification including the printed sheet count to the management server, wherein the printed sheet count represents a number of sheets for which the printing has been executed by the printing execution unit.

2. The printing system according to claim 1, wherein the sheet count management unit is further configured to i) subtract, when the image forming apparatus provides a notification including the printed sheet count, the printed sheet count from the remaining quota, and (ii) release the temporary allowance of the logged-in user.

3. The printing system according to claim 1, wherein:

the image forming apparatus further comprises a requested sheet count rejection notification unit configured to provide a notification that the printing for the requested sheet count is not executable; and the requested sheet count rejection notification unit is configured to provide a notification that the printing for the requested sheet count is not executable when the temporary allowance is smaller than the requested sheet count.

4. The printing system according to claim 3, wherein:

the image forming apparatus further comprises a copy count change receiving unit configured to receive a change of a number of print copies;

the copy count change receiving unit is further configured to receive, when notified that the printing for the requested sheet count is not executable, the change to such a copy count that the sheet count for which the printing is executed by the printing execution unit falls within the range of the temporary allowance; and the printing execution unit is configured to execute the printing for the copy count whose change has been received by the copy count change receiving unit.

5. The printing system according to claim 3, wherein:

the image forming apparatus further comprises:

a cancellation instruction receiving unit configured to receive an instruction to cancel the printing; and a print cancellation notification unit configured to provide a notification to the management server of cancellation of the printing;

the cancellation instruction receiving unit is configured to receive, when notified that the printing for the requested sheet count is not executable, the instruction to cancel the printing;

the print cancellation notification unit is configured to provide an notification, when the instruction to cancel the printing is received, to the management server of the cancellation of the printing; and the sheet count management unit is configured to release, when the management server is notified of the cancellation of the printing, the temporary allowance of the logged-in user.

6. A printing method performed by a printing system comprising a management server and an image forming apparatus that are connected via a network, the printing method comprising:

via the management server, executing an authentication of a logged-in user of the image forming apparatus;

managing a remaining quota that represents a remaining number of print sheets allocated to a group to which the user belongs and a temporary allowance that represents a number of print sheets temporarily allowed for every user that belongs to the group;

reserving, when the image forming apparatus provides a notification including a requested sheet count that represents a sheet count based on an instruction for printing and is a number of print sheets for which permission is requested to the management server, the temporary allowance of a logged-in user based on the requested sheet count and the sheet count obtained by dividing a tentative remaining quota, which is obtained by subtracting the temporary allowances of all the users belonging to the group from the remaining quota of the group to which the logged-in user belongs, by a number of users who have logged in to any one of the image forming apparatus within the printing system among the users belonging to the group;

providing a notification to the image forming apparatus of the reserved temporary allowance;

via the image forming apparatus, providing the notification to the management server including the requested sheet count;

executing printing within a range of the temporary allowance notified of by the management server; and providing a notification to the management server of a printed sheet count that represents a number of sheets for which the printing has been executed.

7. The printing method according to claim 6, further comprising:

via the management server, subtracting, when the printed sheet count is notified of by the image forming apparatus, the printed sheet count from the remaining quota and releasing the temporary allowance of the logged-in user.

8. The printing method according to claim 6, further comprising:

via the image forming apparatus, providing a notification to that the printing for the requested sheet count is not executable when the temporary allowance is smaller than the requested sheet count.

9. The printing method according to claim 8, further comprising:

via the image forming apparatus, receiving, when notified that the printing for the requested sheet count is not executable, a change to such a copy count that the sheet count for which the printing is executed falls within the range of the temporary allowance; and executing the printing for the copy count whose change has been received.

10. The printing method according to claim 8, further comprising:
via the image forming apparatus,
receiving, when notified that the printing for the requested sheet count is not executable, an instruction to cancel the printing;
providing a notification to, when the instruction to cancel the printing is received, to the management server of cancellation of the printing; and
via the management server,
releasing, when the cancellation of the printing is notified of by the image forming apparatus, the temporary allowance of the logged-in user.

11. A printing system, comprising a management server and an image forming apparatus that are connected to a network,
the management server comprising:
an authentication execution unit configured to authenticate a logged-in user of an image forming apparatus;
a sheet count management unit configured to i) manage a remaining quota that represents a remaining number of print sheets allocated to a group to which the logged-in user belongs and a temporary allowance that represents a number of print sheets temporarily allowed for every user that belongs to the group, and ii) reserve, when the image forming apparatus provides a notification including a requested sheet count that represents a sheet count based on an instruction for printing and is a number of print sheets for which permission is requested to the management server, the temporary allowance of the logged-in user based on the requested sheet count and the sheet count obtained by dividing a tentative remaining quota, which is obtained by subtracting the temporary allowances of all the users belonging to the group from the remaining quota of the group to which the logged-in user belongs, by a number of users who have logged in to any one of the image forming apparatus within the printing system among the users belonging to the group; and
a temporary allowance notification unit configured to provide a notification including the temporary allowance to the image forming apparatus.

12. The printing system according to claim 11, wherein the sheet count management unit is further configured to
i) subtract, when the image forming apparatus provides a notification including the printed sheet count, the printed sheet count from the remaining quota, and
ii) release the temporary allowance of the logged-in user.

13. The printing system according to claim 11,
the image forming apparatus comprising:
a requested sheet count notification unit configured to provide the notification including the requested sheet count to the management server;
a printing execution unit configured to print within a range of the temporary allowance notified of by the management server; and
a printed sheet count notification unit configured to provide a notification including the printed sheet count to the management server, wherein the printed sheet count represents a number of sheets for which the printing has been executed by the printing execution unit.

14. The printing system according to claim 13, wherein:
the image forming apparatus further comprises a requested sheet count rejection notification unit configured to provide a notification that the printing for the requested sheet count is not executable; and
the requested sheet count rejection notification unit is configured to provide a notification that the printing for the requested sheet count is not executable when the temporary allowance is smaller than the requested sheet count.

15. The printing system according to claim 14, wherein:
the image forming apparatus further comprises a copy count change receiving unit configured to receive a change of a number of print copies;
the copy count change receiving unit is further configured to receive, when notified that the printing for the requested sheet count is not executable, the change to such a copy count that the sheet count for which the printing is executed by the printing execution unit falls within the range of the temporary allowance; and
the printing execution unit is configured to execute the printing for the copy count whose change has been received by the copy count change receiving unit.

16. The printing system according to claim 14, wherein:
the image forming apparatus further comprises:
a cancellation instruction receiving unit configured to receive an instruction to cancel the printing; and
a print cancellation notification unit configured to provide a notification to the management server of cancellation of the printing;
the cancellation instruction receiving unit is configured to receive, when notified that the printing for the requested sheet count is not executable, the instruction to cancel the printing;
the print cancellation notification unit is configured to provide a notification to, when the instruction to cancel the printing is received, the management server of the cancellation of the printing; and
the sheet count management unit is configured to release, when the management server is notified of the cancellation of the printing, the temporary allowance of the logged-in user.

* * * * *